Patented Apr. 6, 1937

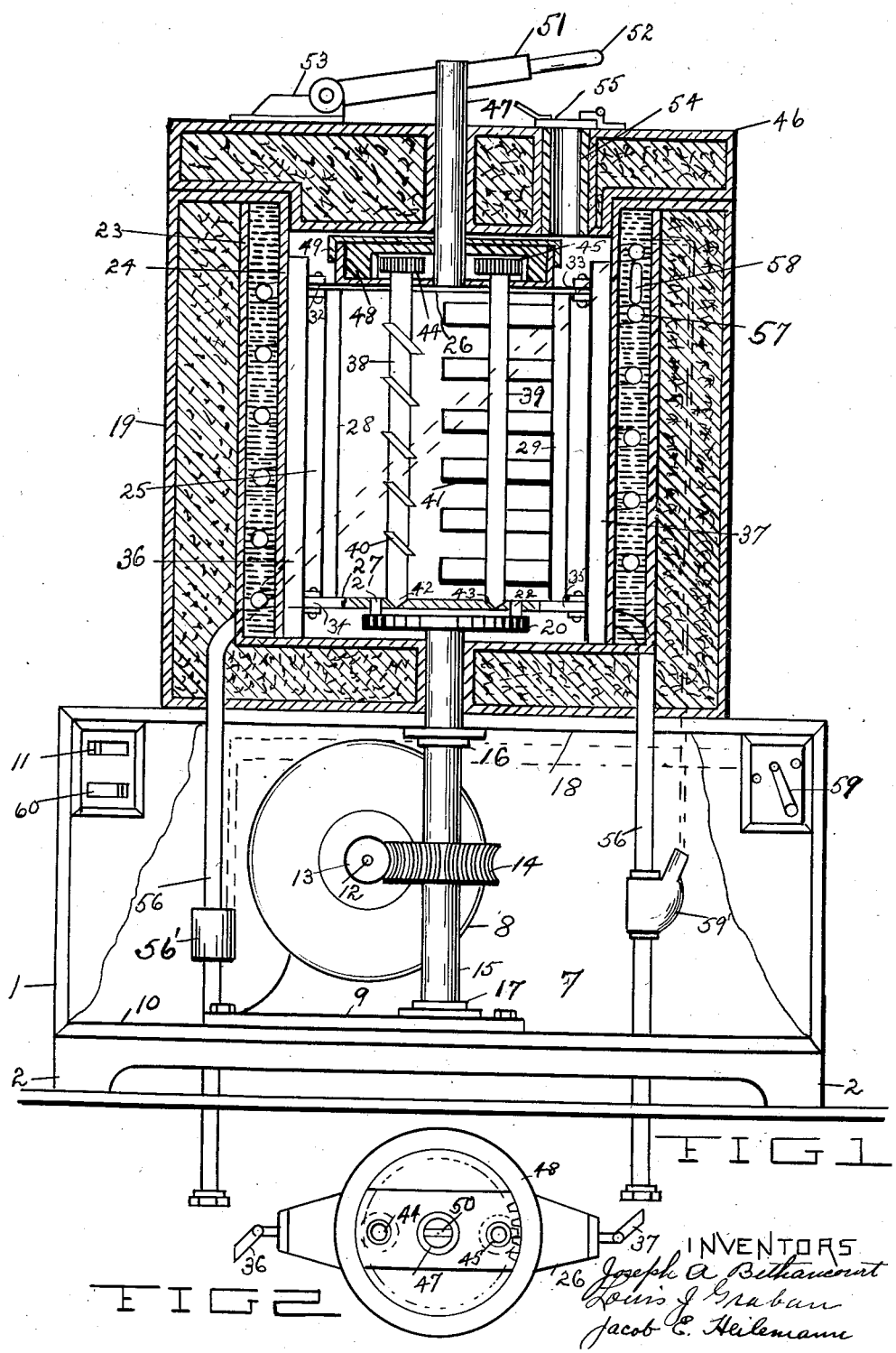

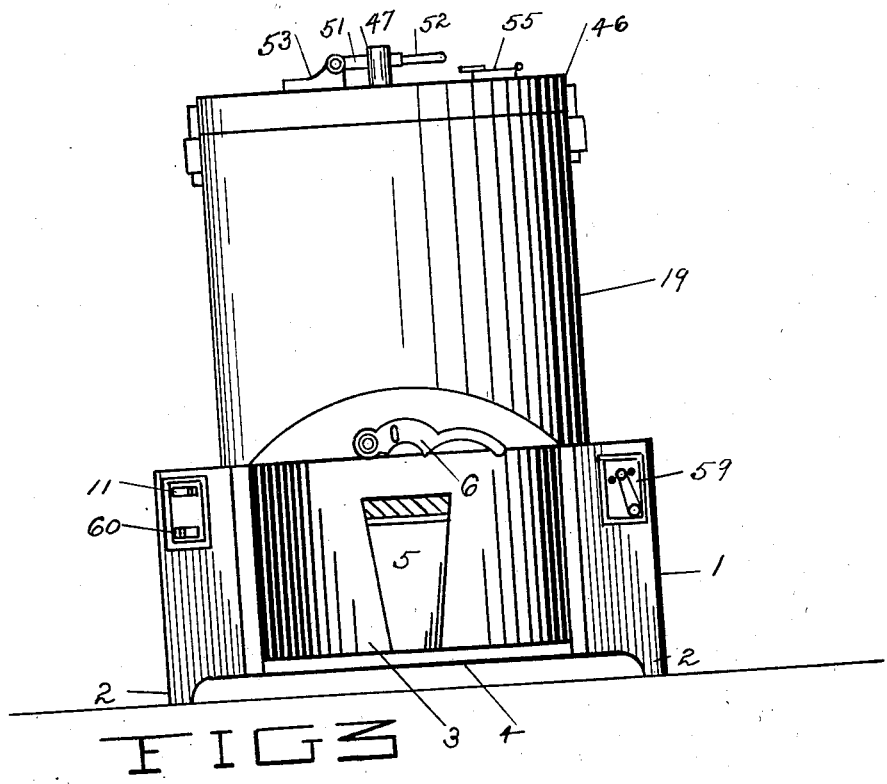

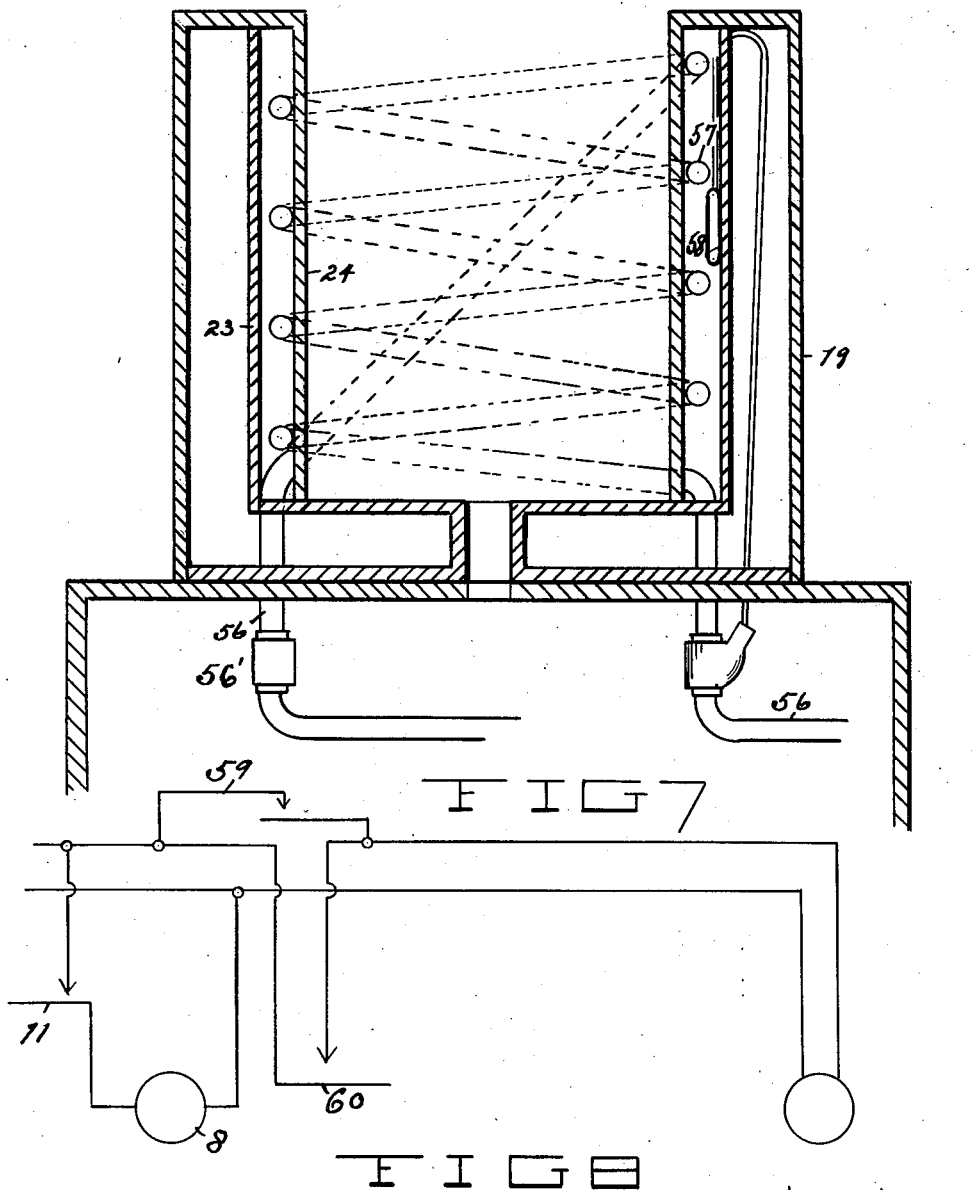

2,076,114

UNITED STATES PATENT OFFICE 2,076,114

APPARATUS FOR MANUFACTURE AND DISPENSING OF FROSTED DRINKS AND/OR FOODS

Joseph A. Bethancourt, Louis J. Grabau and Jacob E. Heilemann, Dallas, Tex., assignors to Malt-O-Matic Corporation of America, a corporation of Texas Application February 2, 1934, Serial No. 709,501

3 Claims. (Cl. 62—114)

This invention relates to an apparatus for producing a synthetically created food and/or beverage of suitable density, color, and flavor, through and by means of a time-saving process, whereby the mixture is subjected to variant rarefactions during the process while under refrigeration, extracting the heat-units from the mass without permitting solidification thereof.

The invention, through particular apparatus, comprehends the manufacture, rarefaction, maintenance and dispensing of a synthetic product in desired form, coloring, flavoring and densities.

The object of the invention is to manufacture, store, treat and dispense a food and/or drink or beverage product, maintained during storage, and during dispensing in a predetermined condition.

Another object of the invention is to provide for the constant and variant rarefaction of the synthetic mixture for given periods in order to develop, produce, and dispense a smooth, cold, palatable and nutritious product.

Other objects of the invention will appear from a reading of the following specification.

An embodiment of the apparatus for developing the process is shown on the accompanying sheets of drawings forming a part of said specification, and whereon, Figure 1 is an elevational view partly in section, showing the construction of the device;

Figure 2 is a detail view of a ring and spur-gear construction, including a portion of the mixing-frame;

Figure 3 is an elevational view of the device, and shows the container-receiving dome;

Figure 4 is an elevation of the arbor and its studs;

Figure 5 is a bottom view of the base of the mixing-frame;

Figure 6 is a top plan view of the cover for the device;

Figure 7 is a view in elevation showing the coils, container, thermal-bulb and its controlling valve, and Figure 8 is a diagrammatic outline view of the wiring.

In these several views, like characters of reference indicate like parts.

A cabinet 1 is supported upon the usual feet 2, and at the front thereof is a depressed, drink-container, receiving-dome 3 rising from the table 4, and on which may be disposed a container 5 to receive the product as it flows from a spigot 6.

Within said cabinet is a compartment 7 in which is located a motor 8 mounted on its usual base 9, and bolted to the base 10 of the cabinet 1, and which motor is controlled by a switch 11 contained in a switch-plate mounted on the front of said cabinet 1. The driving-shaft 12 of the motor 8 extends sufficiently beyond its bearing to receive a worm 13, which meshes with a worm-gear 14, mounted upon a vertical shaft 15 within the power-compartment 7, and which shaft is borne in housings 16 and 17 provided with ball-bearings.

By reference to Figure 1, the shaft 15, at its upper extremity protrudes through the housing 16, the top 18 of the cabinet 1 and through the bottom of a container 19, and is here provided with an arbor 20, having diametrically opposed studs 21 and 22.

Within the container 19 is a secondary dual container consisting of two concentric shells 23 and 24, the inner shell 24 forming a mixing chamber 25 in which the mix for the synthetic product is contained and processed.

Within the chamber 25 is a frame consisting of a header 26, a base 27, and two uprights 28 and 29. The base 27 is provided with sockets 30 and 31 to receive the studs 21 and 22 which project upwardly from the arbor 20. With this arrangement, upon the motion of the shaft 15 through the worm-gear 14 and the worm 13, operable by the motor 8, the frame will rotate within the wall 24 of the mixing chamber 25.

To prevent adhesion of the refrigerating synthetic mix to the wall 24 of the mixing-chamber 25, lugs 32, 33, 34 and 35 are formed on the header 26 and the base 27 of the frame and extend outwardly therefrom and to these lugs are journalled scrapers 36 and 37, whose beaks scrape the wall 24 of the container 25.

Within the mixing-frame are supported two uprightly disposed rotatable shafts 38 and 39, each having a series of agitator paddles 40 and 41, one set being staggered with relation to the other set in order to permit the passage of each during rotation of both. The lower ends of these shafts are conically pointed as shown at 42 and 43, and rotate in likewise formed seats in the base 27 of the mixing-frame. The upper ends of the shafts 38 and 39 project above the header 26 and receive counterclockwise rotating spur-gears 44 and 45.

A cover 46 is provided both for the container 19 and the mixing-chamber 25, covering also the chamber formed by the shells 23 and 24, and this cover, and the container 19 are suitably insulated, as, for instance, by cork or other suitable insulation. Through a central opening running down through the cover 46, extends a shaft 47, the lower end of which is provided with a ring-gear 48, which is in mesh with the counter clockwise rotating spur-gears 44 and 45. This construction is enclosed within a casing 49 to prevent any lubricating substances created by the meshing of the gears from contacting with the synthetic mass within the mixing-chamber 25, and the casing 49 is suitably maintained in connection with the header 26 of the mixing frame.

The upper extremity of the shaft 47 is diametrically slotted (see Figure 6) as at 50, and into this slot, at will, may be dropped a lever 51, provided with a handle 52, which is movably supported in bearings 53, mounted upon the cover 46. Normally, when the motor is in operation, the ring-gear, spur-gears, shafts and paddles will lazily rotate due to the influence of the mix in the chamber 25. The paddles will travel counterclockwise in dual and reverse motion likewise operating the paddles 40 and 41 in the mixing chamber 25. When the lever 51 is dropped into the slot 50 of the shaft 47, the ring-gear 48 will remain in fixed position and obviously the shafts 38 and 39 and paddles 40 and 41 will speed up and produce sufficient rarefaction in the synthetic mix to make the resultant product fluffy, light, digestible and palatable and cause a uniform synthetic product in the chamber 25. When that point in the operation is reached when the mix needs only lesser agitation to prevent disintegration and solidification, preparatory to dispensing the same through the spigot 6, the lever 51 may be lifted out of the slot 50 and the paddles 40 and 41 may continue their normal agitating operation with the mass in the mixing chamber 25, and at the same time more evenly and thoroughly mix the ingredients up to and including the time of its dispensing through the spigot 6 into the container 5.

Down into the secondary container 25 depends a portion of the cover 46 and through this cover and depending portion is an opening 54 forming an inlet leading into the container so that during the manufacturing operation, on account of the depletion through dispensing, the mixing chamber 25 may be refilled without interference with the manufacture and synthetizing operation or processing of the material within the mixing chamber 25. The inlet 54 is provided with a sanitary cover 55, suitably applied to prevent dirt or atmospheric air from reaching the secondary mixing chamber 25.

From a suitable compressor (not shown) a lead-pipe 56 terminates in a coil 57 surrounding the mixing chamber wall 24, and this coil is submerged in an alcoholic solution in the container formed by the shells or walls 23 and 24, and in this solution is also submerged a thermal-bulb 58 controlling an automatic adjustable temperature control switch 59, located on the face of the cabinet and which in turn controls the expansive valve 59'. A switch 60 provides for manually controlling the operation of the electrically impulsed compressor, when such is employed, it being understood that either natural or artificial refrigeration may be adopted at will.

It will now be seen that our invention relates to the manufacture, processing, maintaining, rarefaction and dispensing of frosted foods and/or drinks of any desired consistency, synthesis, flavoring, coloring or density, in which, by the application of various degrees of refrigeration, either mechanical or natural, a palatable product will result.

Again, that a new, useful and time-saving device, is disclosed for the purpose of dispensing a continuously manufacturable product.

The terms "synthetic" and "rarefaction" as herein used are employed to teach that during the heat unit extracting process by the agitation of the paddles, especially under the idling thereof, the synthetic mix will be made rare, thin, porous, fluffy, or less dense.

Having thus set forth this invention we claim:

1. In an apparatus of the type set forth, the combination with a cabinet having a power-compartment, a drink-container receiving niche indented into said cabinet, a power-unit in said power-compartment, a container supported by said cabinet; a secondary container within the first-named container and forming a mixing-chamber; an agitator-frame revolving in said mixing-chamber; means for operatively connecting the agitator-frame with the power-unit; shafts in said frame; agitator-blade thereon; spur-gears secured to said shafts, a ring-gear for operating said spur-gears counterclockwise; means to arrest the rotation of the ring-gear supporting means; means to dispense the product from the mixing-chamber; a cover for the dual containers; a cover for the mixing-chamber and having an inlet; a refrigerating solution in the chamber formed by the first and secondary containers; a refrigerating coil convoluted about the mixing chamber and submerged in said solution; a thermal-bulb in said solution; a manually operated switch to control the operation of the power motor; a manually operated switch for controlling the refrigerating unit, and means connecting the coil to said refrigerating unit.

2. In an apparatus of the type set forth, the combination with a cabinet having a power-compartment; an inset drink-container receiving niche in the front of the cabinet; a power-unit in said compartment; a container supported by the cabinet; a secondary container within said container and adapted to be filled with a refrigerant; a mixing-chamber formed by the secondary container; an agitator-frame rotatable in the mixing-chamber; means for operatively connecting the agitator-frame with the power-unit; shafts journalled in said frame; agitator-paddles thereon; spur-gears secured to said shafts; a ring-gear for operating said spur-gears counterclockwise; means to support the ring-gear; means to control the movement of the ring-gear supporting means; means to dispense the product from the mixing-chamber; a cover for the containers and having an inlet into the mixing-chamber; a refrigerating-coil convoluted about the secondary mixing-chamber and submerged in the refrigerant; a thermal-bulb in said refrigerant; and means to control the power of the power-unit, and the temperature of the refrigerant.

3. In an apparatus of the kind set forth, the combination with a cabinet having a power-compartment; an inset drink-container receiving niche in the cabinet; a power-unit in said compartment; a container supported by the cabinet; a secondary container within said container and adapted to be filled with a refrigerant; a mixing-chamber formed by the secondary container; an agitator-frame rotatable in the mixing-chamber; means to operatively connect the agitator-frame with the power-unit; shafts journalled in said frame; agitator-paddles thereon; spur-gears secured to said shafts; a ring-gear for operating said spur-gears counterclockwise; means to support the ring-gear; means to control the movement of the ring-gear supporting means; means to dispense the product from the mixing chamber; a cover for the containers and having an inlet into the mixing-chamber; a refrigerating coil convoluted about the secondary mixing-chamber and submerged in the refrigerant; a thermal-bulb in said refrigerant; means to control the power of the power-unit and the temperature of the refrigerant; and a spigot leading from the mixing-chamber out into the drink-container receiving niche.

JOSEPH A. BETHANCOURT.
LOUIS J. GRABAU.
JACOB E. HEILEMANN.